United States Patent
Lang et al.

(10) Patent No.: US 9,520,755 B2
(45) Date of Patent: Dec. 13, 2016

(54) APPARATUS AND METHOD FOR INDUCTION MOTOR HEAT TRANSFER

(75) Inventors: Nicholas G. Lang, Cincinnati, OH (US); Donald J. Schenk, Hamilton, OH (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 295 days.

(21) Appl. No.: 13/605,389

(22) Filed: Sep. 6, 2012

(65) Prior Publication Data
US 2014/0062227 A1  Mar. 6, 2014

(51) Int. Cl.
| | |
|---|---|
| *H02K 9/22* | (2006.01) |
| *H02K 5/18* | (2006.01) |
| *H02K 9/06* | (2006.01) |
| *H02K 9/08* | (2006.01) |
| *H02K 9/14* | (2006.01) |

(52) U.S. Cl.
CPC ...... *H02K 5/18* (2013.01); *H02K 9/08* (2013.01); *H02K 9/14* (2013.01); *H02K 9/22* (2013.01); *H02K 9/06* (2013.01); *Y10T 29/49009* (2015.01)

(58) Field of Classification Search
CPC .............. H02K 9/22; H02K 5/18; H02K 9/02; H02K 9/04; H02K 9/06; H02K 5/225
USPC ........................................ 310/64, 89
See application file for complete search history.

(56) References Cited

U.S. PATENT DOCUMENTS

| | | | | |
|---|---|---|---|---|
| 900,977 | A | * | 10/1908 | Behrend ................. 310/58 |
| 2,458,010 | A | * | 1/1949 | Ludwig .............. H02K 9/22 29/598 |
| 3,168,348 | A | * | 2/1965 | Fleming et al. ............ 301/6.3 |
| 4,444,994 | A | * | 4/1984 | Baker et al. .............. 174/16.3 |
| 4,654,551 | A | * | 3/1987 | Farr ......................... 310/112 |
| 5,542,176 | A | * | 8/1996 | Serizawa ........... B21C 37/225 165/185 |
| 5,698,913 | A | * | 12/1997 | Yagi et al. .................... 310/58 |
| 5,757,096 | A | * | 5/1998 | DuBois et al. ............. 310/68 D |
| 6,000,132 | A | * | 12/1999 | Butler ...................... 29/890.03 |
| 6,568,193 | B1 | * | 5/2003 | Cahill .................... F25B 21/02 310/52 |
| 7,105,966 | B2 | * | 9/2006 | Kopf et al. ................... 310/89 |
| 2005/0035673 | A1 | * | 2/2005 | Lafontaine ........... H02K 1/187 310/58 |
| 2006/0021740 | A1 | * | 2/2006 | Chi-Hsueh .............. 165/104.33 |
| 2006/0219386 | A1 | * | 10/2006 | Hsia et al. .................. 165/80.3 |

(Continued)

FOREIGN PATENT DOCUMENTS

| | | | |
|---|---|---|---|
| DE | 626123 C | * | 2/1936 |
| JP | 2005278358 A | * | 10/2005 |

OTHER PUBLICATIONS

Nakamoto (JP 2005278358 A) English Translation.*
Sachsenwerk Licht (DE 626123 C) English Translation.*

*Primary Examiner* — Quyen Leung
*Assistant Examiner* — Robert E Mates

(57) ABSTRACT

A heat sink apparatus for induction motors and other dynamoelectric machines. The heat sink has a mounting portion adapted for coupling to a motor housing. A first heat sink portion is adapted for insertion into a motor housing interior, such as through an aperture in the frame or bearing bracket, and is thermally coupled to a second heat sink portion that is adapted for orientation outside the housing. The heat sink apparatus first heat sink portion may be inserted within an air channel of a TEFC induction motor. The heat sink preferably has a higher heat transfer rate than the motor housing.

15 Claims, 5 Drawing Sheets

(56) References Cited

U.S. PATENT DOCUMENTS

| | | | |
|---|---|---|---|
| 2008/0187797 A1* | 8/2008 | Edlund | 429/17 |
| 2009/0237038 A1* | 9/2009 | Heidebrink | 322/28 |
| 2009/0250197 A1* | 10/2009 | Hassett | F28D 15/0275 |
| | | | 165/104.26 |
| 2010/0074779 A1* | 3/2010 | Hebrard et al. | 417/437 |

* cited by examiner

APPARATUS AND METHOD FOR INDUCTION MOTOR HEAT TRANSFER

BACKGROUND OF THE INVENTION

1. Field of the Invention

The invention relates to induction motor and other dynamoelectric machine heat transfer apparatus and more particularly to heat sinks for induction motors that transfer heat generated within the motor housing interior to the housing exterior.

2. Description of the Prior Art

Known totally enclosed fan cooled (TEFC) induction motors are sealed from ambient air, and are often used in harsh environments—weather related or potentially volatile atmospheres that are not suitable for exposure to live electrical power sources. Generally, TEFC motors dissipate internal heat by conductive heat transfer through the motor housing. Housing heat transfer is often enhanced by addition of airflow channels within the housing that circulate hot air from the rotor and stator portions of the motor to the housing periphery, often with assistance of a shaft-mounted internal circulation fans. Heat within the airflow channels is transferred through the housing to its exterior. Rows of cooling tins projecting from the housing exterior surface and an external fan/fan shroud that directs cooling air over the external cooling fins assist heat transfer away from the motor. External fan-induced airflow over the fins enhances convective heat transfer away from the motor cooling fins to ambient atmosphere.

It is challenging to provide sufficient external cooling air flow over TEFC motor cooling fins—especially when the motor is subjected to a heavy external driven load operating condition. Often a TEFC motor housing or yoke is constructed of cast iron or cast steel, with integrally cast cooling fins. Those metals have lower thermal conductivity than other metals, such as copper or aluminum. Copper or aluminum may not have sufficient structural strength for higher power induction motor housings. It is not always economically feasible to construct TEFC motor housings from steel or cast iron, and then attach higher conductivity copper or aluminum cooling fins to the housing exterior. An additional heat transfer challenge for TEFC motors is their use of exterior paint and/or sound-deadening coatings that are relatively poor thermal conductors. Those coatings further degrade heat transfer capabilities of TEFC motor housings.

Under extreme motor load conditions the only practical recourse may be to substitute a more expensive totally enclosed water cooled motor for a TEFC motor. While the substitution may be acceptable for new motor installations, it may not be practical or cost effective to swap out a TEFC motor for new water cooled motor if the shop floor does not have an available cooling water source. Some operating environments are not suitable for water cooled motors.

SUMMARY OF THE INVENTION

Accordingly, an object of the invention is to enhance cooling capabilities of existing induction motors, including totally enclosed fan cooled (TEFC) induction motors.

Another object of the invention is to build new induction motors, including totally enclosed fan cooled (TEFC) motors, or rebuild older motors during scheduled service and maintenance intervals, that have enhanced cooling capabilities, but with minimal modifications to existing designs and building practices.

These and other objects are achieved in accordance with the present invention by a heat sink apparatus for induction motors and other dynamoelectric machines. The heat sink has a mounting portion adapted for coupling to a motor housing. A first heat sink portion is adapted for insertion into a motor housing interior, such as through an aperture in the frame or bearing bracket, and is thermally coupled to a second heat sink portion that is adapted for orientation outside the housing. The heat sink apparatus first heat sink portion may be inserted within an air channel of a TEFC induction motor. The heat sink preferably has a higher heat transfer rate than the motor housing, such as by use of materials having higher heat transfer coefficients and/or larger heat transfer surface area by use of fins or other channels.

Embodiments of the present invention feature an induction motor heat sink apparatus, having a mounting portion adapted for coupling to a motor housing. A first heat sink portion is adapted for insertion into a motor housing interior. In some embodiments the first heat sink portion is inserted into an airflow channel formed within the housing. A second heat sink portion is thermally coupled to the first heat sink portion, adapted for orientation outside the housing.

Other embodiments of the present invention feature an induction motor with a housing having an interior, an exterior surface and an aperture in communication with both. The motor also includes a heat sink, having a mounting portion that is coupled to the housing. A first heat sink portion is inserted into the housing aperture in communication with the housing interior. A second heat sink portion is thermally coupled to the first heat sink portion, in communication with environment outside the housing.

Yet other embodiments of the present invention are directed to methods for cooling an induction motor by providing a motor housing having an aperture in communication with an interior and exterior of the housing. A heat sink having a higher heat transfer rate than that of the housing is inserted into the aperture, so that it is in thermal communication with the housing interior and exterior. The heat sink may be inserted into an aperture that it is in thermal communication with an internal airflow channel defined within the housing interior.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
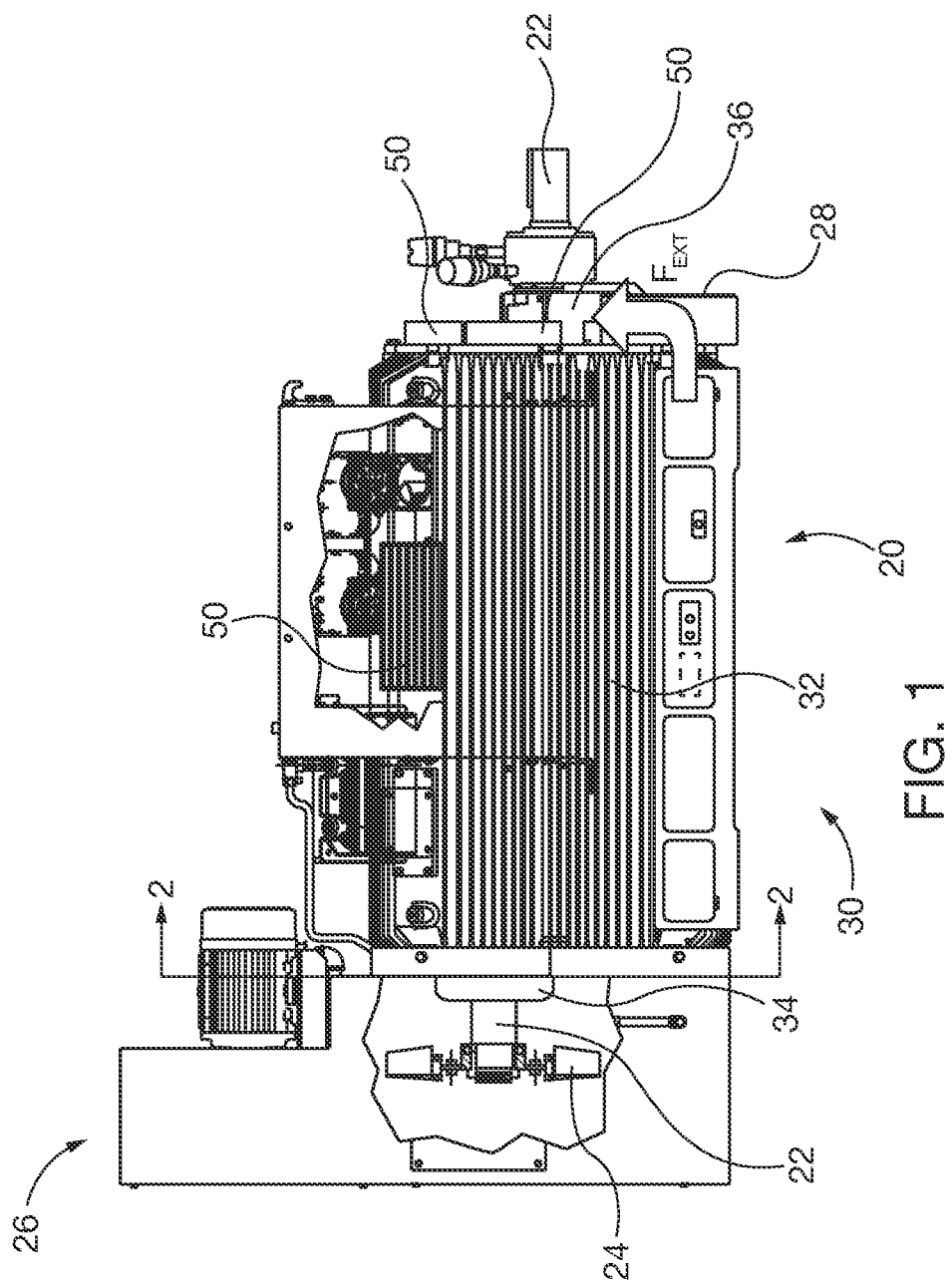
FIG. 1 shows aside devotional view of an embodiment of a totally enclosed fan cooled (TEFC) induction motor dynamoelectric machine of the present invention.

After considering the following description, those skilled in the art will clearly realize that embodiments of the present invention can be readily utilized in a heat sink apparatus for dynamoelectric machines including induction motors. The heat sink has a mounting portion adapted for coupling to a machine housing. In some embodiments a first heat sink portion is adapted for insertion into a motor housing interior, such as through an aperture in the frame or bearing bracket, and is thermally coupled to a second heat sink portion that is adapted for orientation outside the housing. Advantageously the heat sink apparatus first heat sink portion may be inserted within an air channel of a TEFC induction motor.

Referring to the embodiments of FIGS. 1-4, a totally enclosed fan cooled (TEFC) induction motor dynamoelectric machine 20 has a motor shaft 22 driving an external cooling fan 24. The fan 24 is enveloped by external fan shroud 26, which along with air deflector 28 directs external cooling air flow $F_{EXT}$ in circuits about the motor housing 30 exterior, including the frame or yoke 32 circumference, the fan-end bearing bracket 34 and the drive-end bearing bracket 36. Such motors 20 often incorporate internal air channels 38 that with or without internal airflow circulating fans (not shown) direct internal cooling air flow $F_{INT}$ from within the motor housing 30 interior toward the exterior peripheral surfaces of the housing. Heat is transferred from the motor housing 30 interior to its exterior through the housing walls of the frame 32 and the bearing brackets 34, 36.

Figure 5:
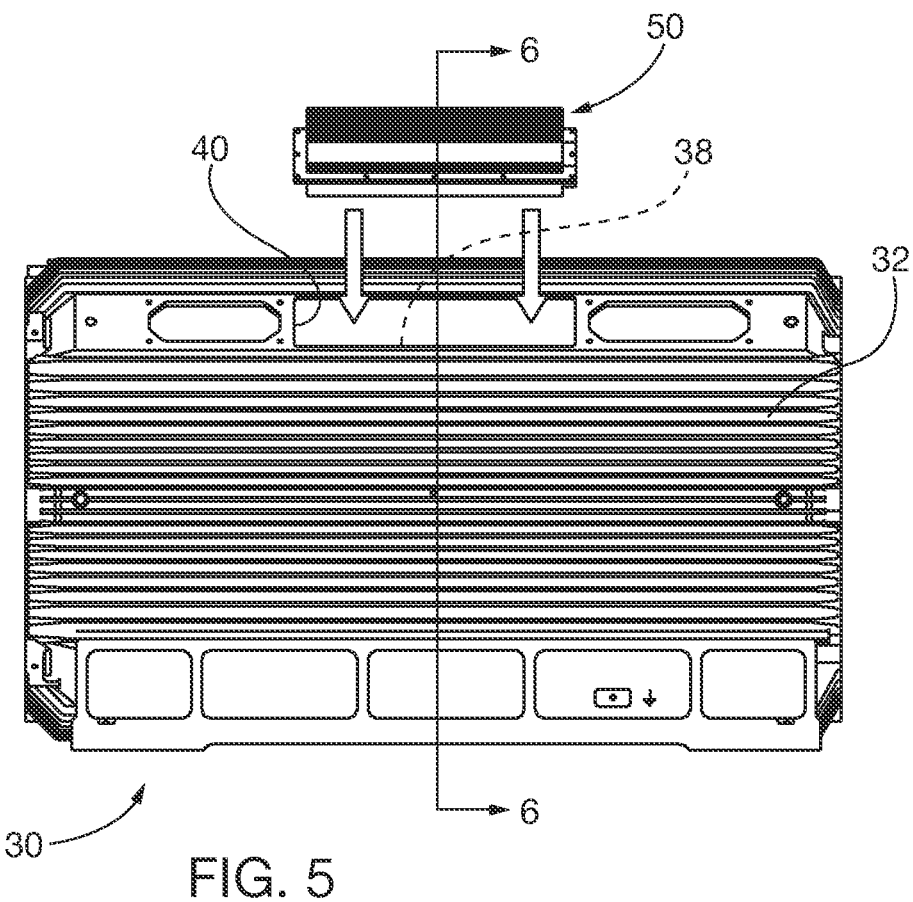
FIG. 5 is amide elevational view of a motor housing frame in accordance with an embodiment of the present invention.
Figure 6:
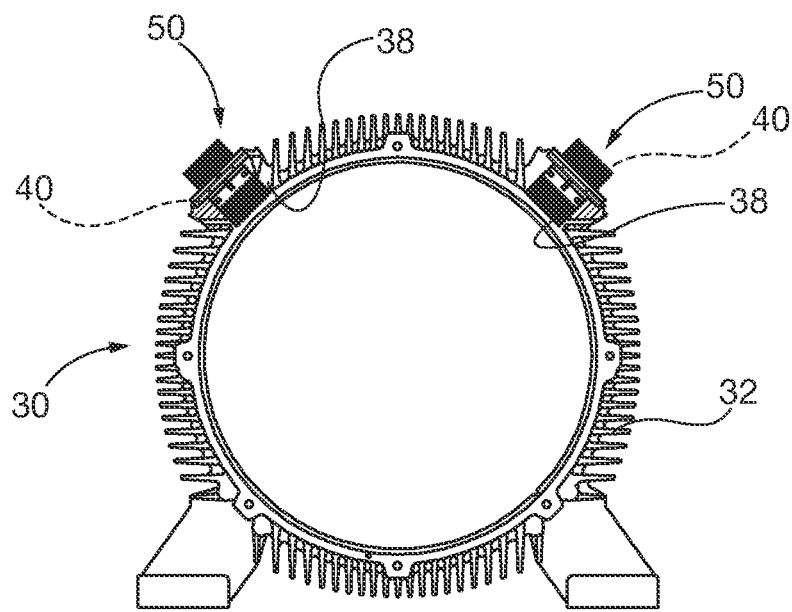
FIG. 6 is a cross sectional elevational view of the motor housing frame of FIG. 5, taken along 6-6 thereof.

As previously noted, the motor housing 30 is often constructed of steel or cast iron for strength. Those materials have relatively low heat conductivity compared to other known materials used in heat exchangers, such as aluminum or copper. However, housing components constructed of aluminum or copper do not have sufficient strength needed for higher power motors or other electrodynamics machines. In embodiments of the present invention a heat sink 50, preferably having a higher exchange transfer rate than the housing 30, transfers heat from the housing 30 interior to its exterior, in addition to the heat transfer function performed by the housing. The heat sink 50 heat transfer rate may be increased relative to the housing 30 heat transfer rate, for example by selecting materials having higher thermal conductivity and/or increasing the heat sink surface area through use of fins. Referring to FIGS. 5 and 6, one or more apertures 40 are formed in the motor housing 30 during its initial fabrication or by removing housing material during motor refurbishment/retrofit. A heat sink 50 is inserted into the aperture 40, so that it is in thermal communication with the housing interior. The aperture 40 and heat sink 50 advantageously may be oriented within an airflow channel 38 for increased heat transfer from the internal airflow circuit $F_{INT}$ to the external airflow circuit $F_{EXT}$.

Figure 2:
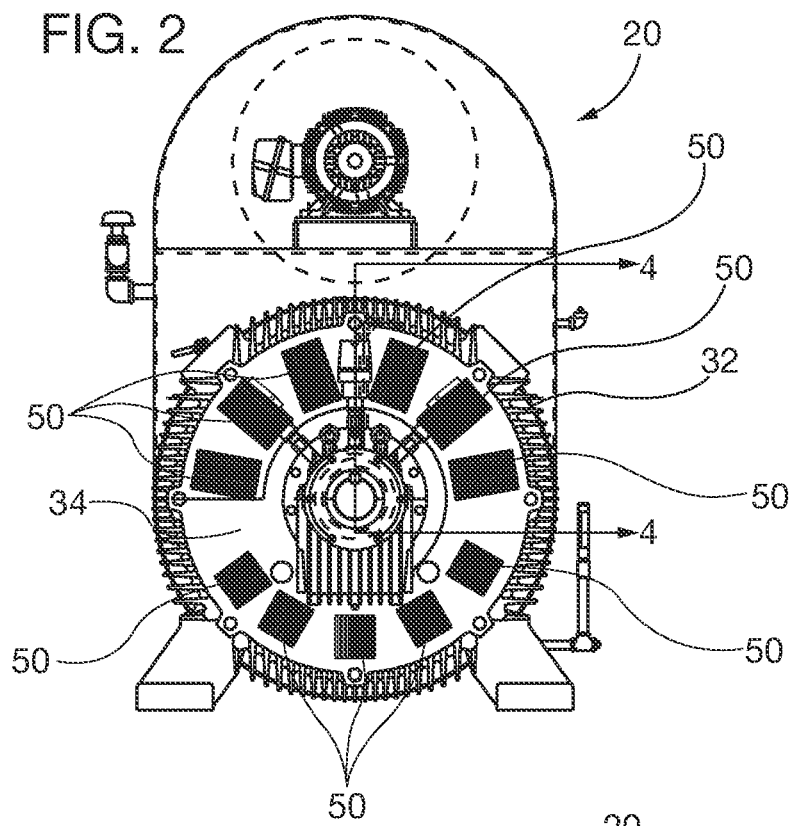
FIG. 2 shows an devotional view of the drive end of the embodiment of FIG. 1, with an air deflector shown in dashed lines, taken along 2-2 of FIG. 1.
Figure 3:
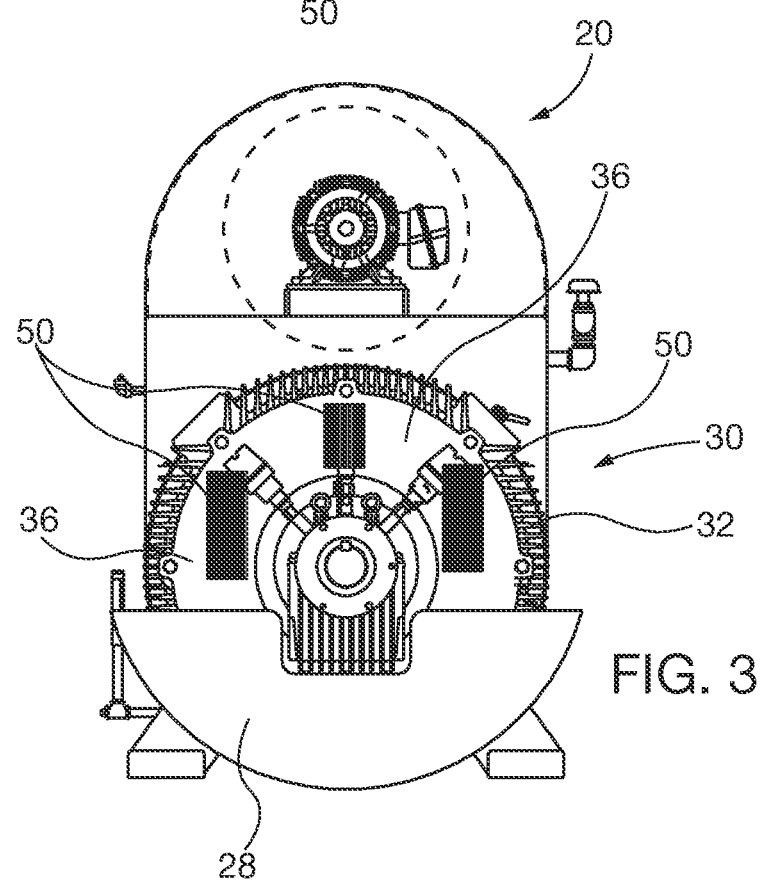
FIG. 3 shows elevational view of the non-drive end of the motor of FIG. 1, with an external fan air shroud shown in dashed lines.
Figure 4:
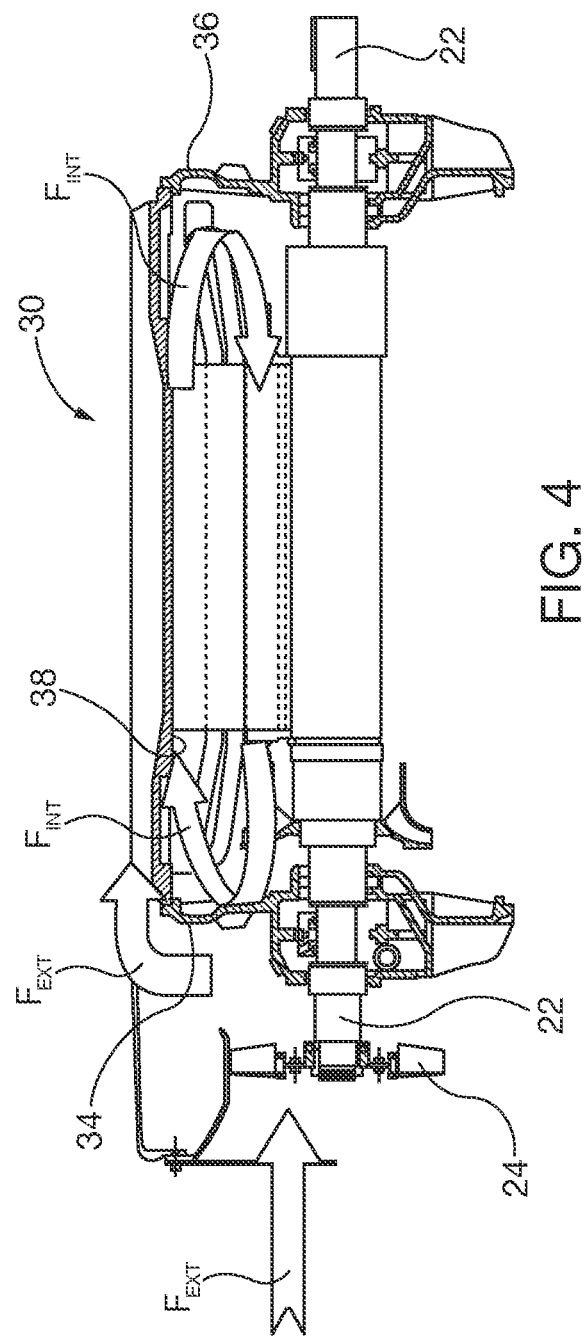
FIG. 4 is a partial axial cross sectional view of the motor of FIG. 2, taken along 4-4 of FIG. 2.

As shown in FIGS. 1-3, pluralities of respective apertures 40 and corresponding heat sinks 50 may be oriented in arrays about the housing 30 exterior. For example, in FIG. 2 heat sinks 50 are in a radial array on the fan-end bearing bracket 34, where they are in direct communication with the external cooling fan 24 airflow. In the drive-end hearing bracket 36 the long axis of heat sinks 50 are oriented vertically so that their surfaces are in direct communication with the external airflow exhausted from the air deflector 28.

Figure 8:
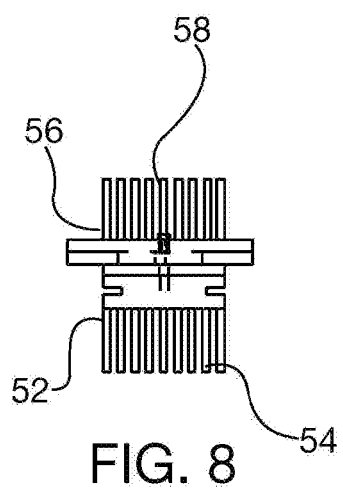
FIG. 8 is a front devotional view of the heat sink of FIG. 7.
Figure 7:
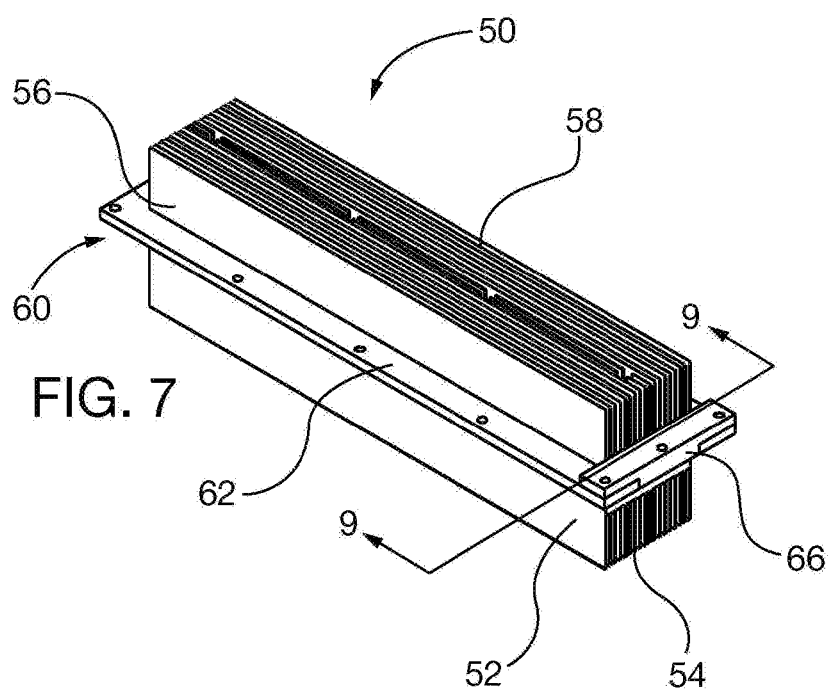
FIG. 7 is a perspective view of an embodiment of a heat sink of the present invention.
Figure 9:
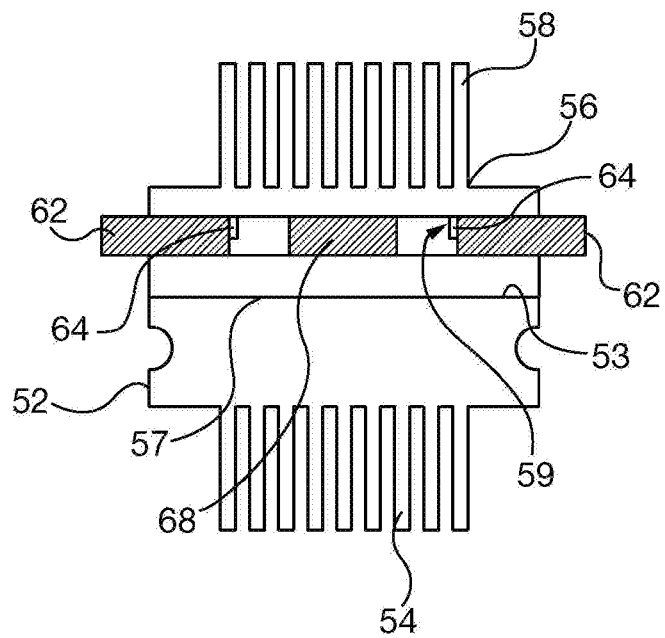
FIG. 9 is a cross sectional elevational view of the heat sink of FIG. 7, taken along 9-9 thereof.

FIGS. 7-9 show an exemplary embodiment of heat sink apparatus 50, having a first heat sink portion 52 that is adapted for insertion into and thermal communication with a motor housing 30 interior. The first heat sink portion 52 has a back face 53 directed toward the motor housing 30 exterior and fins 54 facing inside the motor housing. The first heat sink portion 52 including its fins 54 may be constructed by any known fabrication method including by way of non-limiting example casting, broaching, sintering, metal injection molding, extrusion, and machining. Fin 54 materials, geometry and dimensions can be varied for different heat sink 50 applications. The heat sink 50 has a second heat sink portion 56 that is in thermal communication with the first heat sink portion 52 by direct abutting contact between respective back faces 57 and 53; the back faces being coupled together by known joining methods including by way of non-limiting example fasteners, interlocking joints, welding, soldering and brazing. The second heat sink portion 56 is adapted for orientation outside the housing 30, and has outwardly facing projecting exterior fins 58. As with the interior facing fins 54, the exterior fins 56 material, geometry and dimensions can be varied for different heat sink 50 applications. Alternatively the heat sink 50 may be constructed as a single structure with first and second heat sink portions 52, 56 integrally formed therein.

The exterior facing second heat sink portion 56 has peripheral grooves 59 that mate with a U-shaped platform (i.e., shape in the plan view) mounting plate 60. The mounting plate 60 has a pair of opposed forks 62 with tongues 64 that are engaged by sliding insertion within the second heat sink portion 56 peripheral grooves. The open side of the mounting plate 60 is coupled to bracket 66. A bracket tongue 68 also engages the groove 59. Alternatively the tongue and groove portions may be reversed so that the bracket 60 defines the grooves and the second heat sink portion 56 defines the tongues. Similarly, tongue and groove engagement of the heat sink first portion 52 may be substituted for the engagement with the mounting plate 60 and bracket 66. The mounting plate 60 is in turn coupled to the motor housing 30 so that the heat sink 50 covers its corresponding housing aperture 40. The heat sink 50 when coupled to the housing 30 may also add structural stiffness to the housing.

Although various embodiments that incorporate the teachings of the present invention have been shown and described in detail herein, those skilled in the art can readily devise many other varied embodiments that still incorporate these teachings. Although various embodiments that incorporate no teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings connections supports, and couplings. Further, "connected" and "coupled" are not restricted to physical or mechanical connections or couplings.

What is claimed is:

1. A dynamoelectric machine heat sink apparatus, comprising:
    a motor housing having a fan-end bearing bracket and an opposed drive-end bearing bracket through which a motor shaft that drives an external cooling fan extends;
    a plurality of apertures through the fan-end bearing bracket and the drive-end bearing bracket;
    a plurality of heat sinks, wherein each heat sink includes:
        a mounting portion adapted for coupling to the motor housing;
        a first heat sink portion adapted for insertion into an interior of the motor housing through one of the apertures; and
        a second heat sink portion thermally coupled to the first heat sink portion, adapted for orientation outside the motor housing, and including a plurality of parallel cooling fins,
        the mounting portion comprising a mounting plate coupled to at least one of the heat sink portions, the mounting plate having a pair of opposed forks with tongues that are engaged by sliding insertion within peripheral grooves of the at least one of the heat sink portions,
        wherein when the mounting portion is coupled to the motor housing, the heat sink is inserted through the aperture and covers the aperture,
    wherein at least one first heat sink of the plurality of heat sinks is arranged through one of the apertures on the fan-end bearing bracket where the heat sink is in direct communication with airflow of the external cooling fan
    wherein a plurality of second heat sinks of the plurality of heat sinks are arranged through apertures on the drive-end bearing bracket where the second heat sinks are in direct communication with the airflow of the external cooling fan, wherein the parallel cooling fins of the plurality of second heat sinks are orientated parallel to each other and extend outwardly from the drive-end bearing bracket in an axial direction.

2. The apparatus of claim 1, wherein the first heat sink portion of each heat sink has fins projecting away from the mounting plate.

3. The apparatus of claim 1, wherein the first and second heat sink portions comprising separate components respectively having coupled abutting faces.

4. The apparatus of claim 3, each of the first and second heat sink portions have fins projecting away from its respective face.

5. The apparatus of claim 1, wherein both heat sink portions have extruded fins projecting away from its respective face.

6. The apparatus of claim 1, wherein each heat sink has a higher heat transfer rate than that of the motor housing.

7. A dynamoelectric machine apparatus, comprising:
    a housing having an interior and an exterior surface,
        wherein the housing includes a fan-end bearing bracket and an opposed drive-end bearing bracket through which a motor shaft that drives an external cooling fan extends, and
        a plurality of apertures through the fan-end bearing bracket and the drive-end bearing bracket;
    a plurality of heat sinks, each heat sink having:
        a mounting portion coupled to the housing;
        a first heat sink portion that is inserted into one of the apertures in communication with an interior of the housing; and
        a second heat sink portion thermally coupled to the first heat sink portion, in communication with an environment outside the housing and including a plurality of parallel cooling fins,
        wherein the mounting portion comprises a mounting plate coupled to at least one of the heat sink portions, the mounting plate having a pair of opposed forks with tongues that are engaged by sliding insertion within peripheral grooves of the at least one of the heat sink portions, and
    wherein the plurality of apertures and heat sinks are oriented in arrays about the housing exterior surface,
    wherein a plurality of first heat sinks of the plurality of heat sinks are arranged through apertures in a radial array on the fan-end bearing bracket where the plurality of first heat sinks are in direct communication with airflow of the external cooling fan,
    wherein a plurality of second heat sinks of the plurality of heat sinks are arranged through apertures on the drive-end bearing bracket where the second heat sinks are in direct communication with the airflow of the external cooling fan, wherein the parallel cooling fins of the plurality of second heat sinks are orientated parallel to each other and extend outwardly from the drive-end bearing bracket in an axial direction.

8. The apparatus of claim 7, wherein the housing further comprises an internal airflow channel in communication with the first heat sink portion of each heat sink that extends through each aperture.

9. The apparatus of claim 7, wherein each heat sink has a higher heat transfer rate than that of the housing.

10. The apparatus of claim 9, wherein the first and second heat sink portions of each heat sink having fins.

11. The apparatus of claim 9, wherein each heat sink comprises material having higher thermal conductivity than material comprising the housing.

12. The apparatus of claim 7, wherein the first and second heat sink portions comprise separate components respectively having coupled abutting faces and fins projecting away from its face.

13. The apparatus of claim 7, wherein the housing includes a housing frame, where a plurality of third heat sinks of the plurality of heat sinks extend through apertures formed in the housing frame.

14. A method for cooling a dynamoelectric machine, comprising:
    providing a motor housing having an interior and an exterior of the housing;
        wherein the housing includes:
            a motor fan-end bearing bracket and an opposed drive-end bearing bracket through which a motor shaft that drives an external cooling fan extends; and
            a plurality of apertures through the fan-end bearing bracket and the drive-end bearing bracket;
    providing a plurality of heat sinks having a higher heat transfer rate than that of the housing, each heat sink comprising:
        a mounting portion coupled to the motor housing;

a first heat sink portion that is inserted into one of the apertures in communication with the housing interior; and a second heat sink portion thermally coupled to the first heat sink portion, in communication with an environment outside the motor housing and including a plurality of parallel cooling fins;

wherein the mounting portion comprises a mounting plate coupled to at least one of the heat sink portions, the mounting plate having a pair of opposed forks with tongues that are engaged by sliding insertion within peripheral grooves of the at least one of the heat sink portions; and inserting the plurality of heat sinks into the plurality of apertures so that the plurality of heat sinks is in thermal communication with the housing interior and exterior, wherein the plurality of apertures and heat sinks are oriented in arrays about the housing exterior, wherein a plurality of first heat sinks of the plurality of heat sinks are arranged through apertures in a radial array on the fan-end bearing bracket where the plurality of first heat sinks are in direct communication with airflow of the external cooling fan, wherein a plurality of second heat sinks of the plurality of heat sinks are arranged through apertures on the drive-end bearing bracket where the second heat sinks are in direct communication with the airflow of the external cooling fan, wherein the parallel cooling fins of the plurality of second heat sinks are orientated parallel to each other and extend outwardly from the drive-end bearing bracket in an axial direction.

15. The method of claim 14, wherein the heat sinks are inserted into the apertures so that each is in thermal communication with an internal airflow channel defined within the housing interior.

* * * * *